UNITED STATES PATENT OFFICE.

GEORGE PHILLIPS, OF KEY WEST, FLORIDA.

PROCESS OF PRESERVING WOOD.

SPECIFICATION forming part of Letters Patent No. 414,248, dated November 5, 1889.

Application filed November 24, 1888. Serial No. 291,820. (No specimens.)

*To all whom it may concern:*

Be it known that I, GEORGE PHILLIPS, a citizen of the United States, residing in the city of Key West, in the county of Monroe and State of Florida, have made a new and useful invention—to wit, a Process for Preparing Piles and other Timbers for Preservation; and I do hereby declare that the following is a specification thereof.

My invention relates, primarily, to a process for preparing piles and other timbers for preservation in water to protect them from decay and the ravages of the *Teredo navalis* and other marine insects; but it may also be successfully applied to the bottoms of boats, vessels, and other water-craft, and to timbers for railroads, bridges, pavements, houses, and submarine and other wooden structures.

In describing the invention I shall, for convenience, describe it as applied to piles, but I do not limit it to that application.

The invention consists generally in coating the outer surface of the pile or other wood with a hot or softened asphaltic material and then applying to the surface of the asphaltic coat a pulverized calcareous material and allowing the mass to set and indurate.

The base of the compound used for coating is asphalt. There are many varieties of this material, and I do not confine myself to any particular variety. I prefer to use that of the Val de Travers in Switzerland, which is almost pure carbonate of lime and bitumen. The nearer the asphalt approaches to that standard the better it is adapted to my invention. The asphalt is melted by heat in any suitable manner (care being taken not to burn, scorch, or overheat it) until it acquires the consistency of thick paint. Mineral tar may be added during the process to assist the thinning. The pile having been previously barked, is then coated with the asphaltic mixture while boiling hot, either by a swab, mop, or brush, or by immersion. More than one such coating may be applied, if desired, to secure the requisite thickness. Then over the surface of the asphaltic coating I sift as much dry, hot, pulverized, calcareous material as the asphaltic coating will absorb. A calcareous material suited for this purpose, and heretofore used by me for this purpose with great success, is a species of sand found in Florida and composed of decomposed shells and coral. This sand is first heated to calcination and is applied while hot, so that the materials may to some extent mix and cohere. Instead of this sand, hot unslaked lime may be used, the use of some such calcareous material being an essential element of the invention, though some silicious sand may be mixed with it to save cost. The coating so formed is allowed to set and indurate, and thereby a tight-fitting jacket is formed around the pile, of a firm stone-like hardness on its exterior, impervious to the action of the elements and the attacks of the *Teredo navalis* and other marine insects.

In applying the invention to other structures, the mode of application will be varied according to the circumstances of each case.

I do not claim, broadly, the use of asphaltum in any composition for the purpose above explained, as the use of it has been suggested in connection with sand or earth; nor do I claim the use of calcareous material, broadly, as a covering for piles or other timbers, as pulverized shells have been heretofore described for this purpose in connection with pitch and tar; nor do I claim herein the coating, that being claimed in another application filed by me in the United States Patent Office, of even date herewith, Serial No. 291,818.

I claim as my invention—

1. The process of preparing piles and other timbers, consisting in first coating the surface of the same with asphaltum and applying to the surface of the asphalt calcareous material, substantially as and for the purpose explained.

2. The process of preparing piles and other timbers, consisting in first coating the surface of the same with asphaltum and applying to the surface of the asphalt unslaked lime, substantially as described, and for the purpose explained.

In witness whereof I have hereunto set my hand and seal.

GEO. PHILLIPS. [L. S.]

Witnesses:
   W. C. MALONEY,
   RAMON ALVAREZ.